United States Patent [19]

Flockenhaus et al.

[11] Patent Number: 4,742,036

[45] Date of Patent: May 3, 1988

[54] CATALYST PLATE

[75] Inventors: Claus Flockenhaus, Essen; Daniel Grimm, Schlangenbad-Bärstadt; Hartmut Kainer, Wiesbaden; Karl H. Laue, Hattingen, all of Fed. Rep. of Germany

[73] Assignee: Didier-Werke AG, Wiesbaden, Fed. Rep. of Germany

[21] Appl. No.: 904,175

[22] Filed: Sep. 5, 1986

Related U.S. Application Data

[63] Continuation-in-part of Ser. No. 831,142, Feb. 19, 1986, Pat. No. 4,695,559, and a continuation-in-part of Ser. No. 887,366, Jul. 17, 1986, abandoned.

[30] Foreign Application Priority Data

Sep. 5, 1985 [DE] Fed. Rep. of Germany ....... 3531651

[51] Int. Cl.$^4$ .......................... B01J 23/74; B01J 35/02
[52] U.S. Cl. .................................... 502/213; 502/527; 423/239
[58] Field of Search .............................. 502/527, 213; 423/213.5, 239

[56] References Cited

U.S. PATENT DOCUMENTS

| | | |
|---|---|---|
| 948,947 | 2/1910 | Wrampelmeier . |
| 4,053,434 | 10/1977 | McArthur ........................ 502/527 X |
| 4,293,447 | 10/1981 | Inaba et al. .......................... 502/350 |

FOREIGN PATENT DOCUMENTS

2639848 12/1977 Fed. Rep. of Germany .

*Primary Examiner*—W. J. Shine
*Attorney, Agent, or Firm*—Nils H. Ljungman

[57] ABSTRACT

The invention relates to catalyst plates for reducing nitrogen oxide in exhaust gases. These plates are molded of granular $Fe_2O_3$ catalyst material and a binder. To achieve high activity and strength in the plates, these are molded of a combination of a first mixture comprised of $Fe_2O_3$ catalyst material and phosphoric acid as binder, and a second, separately-produced mixture comprised of $Fe_2O_3$ catalyst material and sulphuric acid as binder. The plates can also be a molding having layers, which layers have alternate layers of the first and second mixtures.

18 Claims, 4 Drawing Sheets

- ● $H_3PO_4$
- ○ $H_2SO_4$

- ● $H_3PO_4$
- ○ $H_2SO_4$

CATALYST PLATE

CROSS-REFERENCE TO RELATED CO-PENDING APPLICATIONS

This application is a continuation-in-part of co-pending application Ser. No. 831,142 filed on Feb. 19, 1986, now U.S. Pat. No. 4,695,559, entitled "Catalyst for the Selective Reduction of Nitrogen Oxides in Waste Gases And Process For the Manufacture and Use of Such a Catalyst", which corresponds to Federal Republic of Germany Patent Application No. P 35 05 648.7, filed on Feb. 19, 1985; and also a continuation-in-part of co-pending application Ser. No. 887,366 filed on July 17, 1986, now abandoned, entitled "Process For The Production Of Catalysts For The Reduction Of Nitrogen Oxides From Exhaust Gases And Similar Chemical Air Cleaning Processes", which corresponds to Federal Republic of Germany Patent Application No. P 35 26 383.0, filed on July 24, 1985, both of which are assigned to at least one of the same assignees as the instant application.

BACKGROUND OF THE INVENTION

1. Field of the Invention:

The invention relates to a catalyst plate, and more particularly, to a catalyst plate for nitrogen oxide reduction in exhaust gases, which is molded from granular $Fe_2O_3$ catalyst material and a binder.

2. Description of the Prior Art:

Attempts have already been made to manufacture $Fe_2O_3$ catalyst material using sulphuric acid or phosphoric acid as binders. It has thereby been shown that only the sulphuric acid binding leads to a high activity, but it also produces an excessive sensitivity to water, which causes the plates to absorb water and become soft. On the other hand, the phosphoric acid bonding reduces activity, but produces hard plates which are not sensitive to water. Mixtures of phosphoric acid and sulphuric acid lead to a catalyst action which is not always satisfactory. Even the saturation of catalyst plates containing a phosphoric acid binder with sulphuric acid, and vice-versa, results in only moderate improvements.

Catalysts are known, specifically, for example, catalysts containing $Fe_2O_3$, $Cr_2O_3$ or $V_2O_5$. In terms of their action, however, these catalysts leave something to be desired.

Some examples of catalytic technology are found in U.S. Pat. No. 4,259,312, entitled "Process And Apparatus For Catalytically Reacting A Reducing Gas And Water Vapor"; U.S. Pat. No. 4,235,604 entitled "Method For Processing Coke Oven Gas": and U.S. Pat. No. 4,049,777, entitled "Method Of Waste Gas Treatment", all of which are assigned the same assignee as the instant application.

Further examples of catalytic technology are found in U.S. Pat. No. 4,448,895, entitled "Process For Preparation Of Catalyst For Cleaning Exhaust Gases And Catalyst Prepared For The Process", and U.S. Pat. No. 4,503,162, entitled "Catalyst Systems For The Conversion Of Gases".

Examples of reactivation of catalysts useful in nitrogen oxide removal are described in U.S. Pat. No. 4,044,102, entitled "Method For Treating Exhaust Gases", and U.S. Pat. No. 4,043,939, entitled "Reactivation Of Catalysts Useful For Nitrogen Oxide Removal." All of the above-cited patents are incorporated herein by reference as if the texts thereof were fully set forth herein.

OBJECT OF THE INVENTION

The object of the invention, therefore, is the creation of a catalyst plate of the type indicated above, which combines high activity, good strength, and low sensitivity to water.

SUMMARY OF THE INVENTION

The invention achieves this objective, in that the catalyst plate is a molding of a combination of a first mixture and a separately-produced second mixture, whereby the first mixture contains $Fe_2O_3$ catalyst material and phosphoric acid as binder, and the second mixture contains $Fe_2O_3$ catalyst material and sulphuric acid as binder. In spite of the conditions described above, the surprising result is waterproof catalyst plates, which exhibit high activity. The catalyst plates have the advantage of a homogeneous catalyst mixture, and exhibit sufficient abrasion, which is desirable with catalyst plates.

It has also been shown that a catalyst plate of high strength and activity can be produced, also using the principle proposed by the invention, configured of moldings comprising layers. The layers comprise alternately a first mixture of $Fe_2O_3$ catalyst material and phosphoric acid as binder, and a second, separately-produced mixture of $Fe_2O_3$ catalyst material and sulphuric acid as binder.

The outside layer advantageously consists of the second mixture, that is, $Fe_2O_3$ catalyst material and sulphuric acid as binder. Because of these outside layers with sulphuric acid binder, and the resulting softness, the desired abrasion during operation can be achieved.

One aspect of the invention resides broadly in a catalytic structure for reducing at least one oxide of nitrogen, the catalytic structure comprising: a first catalytic material having a first catalytic activity with respect to the at least one oxide of nitrogen and also having a first sensitivity to at least one contaminant which physically degenerates the first catalytic material at a first rate, and a second catalytic material having a second catalytic activity with respect to the at least one oxide of nitrogen and also having a second sensitivity to the at least one contaiminant which physically degenerates the second catalytic material at a second rate. The first catalytic material is disposed in at least one first region in the structure. The second catalytic material is disposed in at least one second region in the structure. The at least one first region and the at least one second region are substantially distinct one from the other, whereby the first catalytic material and the second catalytic material are not substantially mixed within the struture. The first catalytic activity of the first catalytic material is substantially greater than the second catalytic activity of the second catalytic material. The first rate of physical degeneration of the first catalytic material by the at least one contaminant is substantially greater than the second rate of physical degeneration of the second catalytic material by the at least one contaminant, whereby the first catalytic material does degenerate physically when acted upon by the at least one contaminant, in use. The second catalytic material further is substantially insensitive to the at least one contaiminant degenerate when acted upon by the at least one contaminant, in use. The second catalytic material is disposed in the structure to physically reinforce the first catalytic material in the structure, whereby the structure is also reinforced by the second catalytic material, even when the first catalytic material is substantially physically degenerated by the at least one contaminant, whereby the catalytic structure has a catalytic activity which is substantially greater than the catalytic activity of the second catalytic material alone.

Another aspect of the invention relates to the first catalytic material being granular.

A further aspect of the invention relates to the second catalytic material being granular.

A yet further aspect of the invention resides broadly in a catalytic structure wherein the first catalytic material comprises an $Fe_2O_3$ catalyst material with phosphoric acid as a binder, and the second catalytic material comprises $Fe_2O_3$ catalyst material with sulphuric acid as a binder.

Yet another aspect of the invention resides broadly in a catalytic structure wherein the at least one region of the first catalytic material and the at least one region of the second catalytic material are disposed in layers abutting one another in the structure.

Still yet another aspect of the invention resides broadly in a catalytic structure wherein there are a plurality of layers in the structure of the second catalytic material having sulphuric acid as a binder.

A yet further aspect of the invention resides broadly in a catalytic structure wherein the second catalytic material, having the sulphuric acid as a binder, comprises outside layers of the structure.

Yet another aspect of the invention resides broadly in a catalytic structure wherein the catalytic structures comprises a plate of catalytic materials.

A still further aspect of the invention resides broadly in a catalytic structure wherein the at least one region of the first catalytic material comprises a plurality of regions and wherein the at least one region of the second catalytic material comprises a plurality of regions, the first and the second plurality of regions being dispersed throughout a substantial portion of the catalytic body.

Yet another aspect of the invention resides broadly in a catalytic structure wherein the structure is molded.

BRIEF DESCRIPTION OF THE DRAWINGS

Advantageous embodiments of the present invention are illustrated in the accompanying drawings.

DESCRIPTION OF THE PREFERRED EMBODIMENTS

Figure 1:
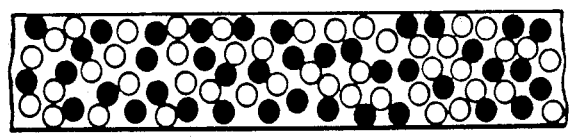
FIG. 1 shows one embodiment of a catalyst plate according to the invention. The catalyst plate was molded from layers of existing moldings, whereby the black spots are intended to represent the catalyst material with phosphoric acid as binder, and the white spots represent sulphuric acid as binder.

FIG. 1 shows one embodiment of a catalyst plate according to the invention. The catalyst plate was molded from layers of existing moldings, whereby the black spots are intended to represent the catalyst material with phosphoric acid as binder, and the white spots represent sulphuric acid as binder.

Figure 2:
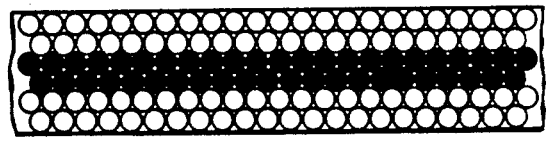
FIG. 2 shows another embodiment of a catalyst plate according to the invention, whereby the inside layer consists of catalyst material with phosphoric acid as binder, and the two outside layers of catalyst material with sulphuric acid as binder.

FIG. 2 shows another embodiment of a catalyst plate according to the invention, whereby the inside layer consists of catalyst material with phosphoric acid as binder, and the two outside layers of catalyst material with sulphuric acid as binder.

Figure 3:
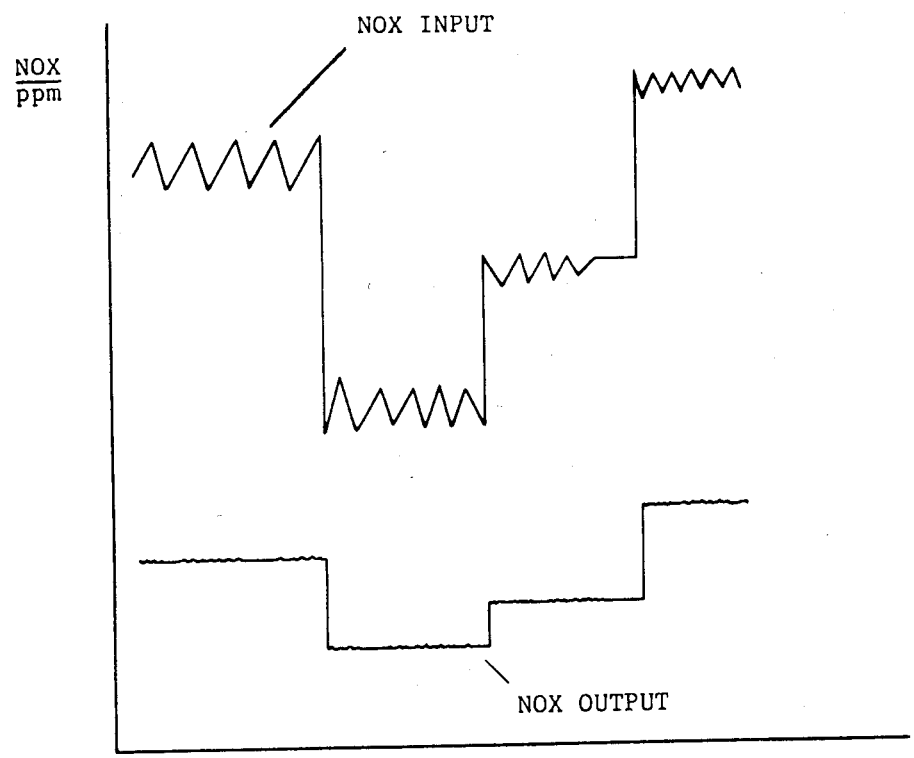
FIG. 3 shows how the catalyst largely compensates for fluctuations in the nitrogen oxide input concentration.
Figure 4:
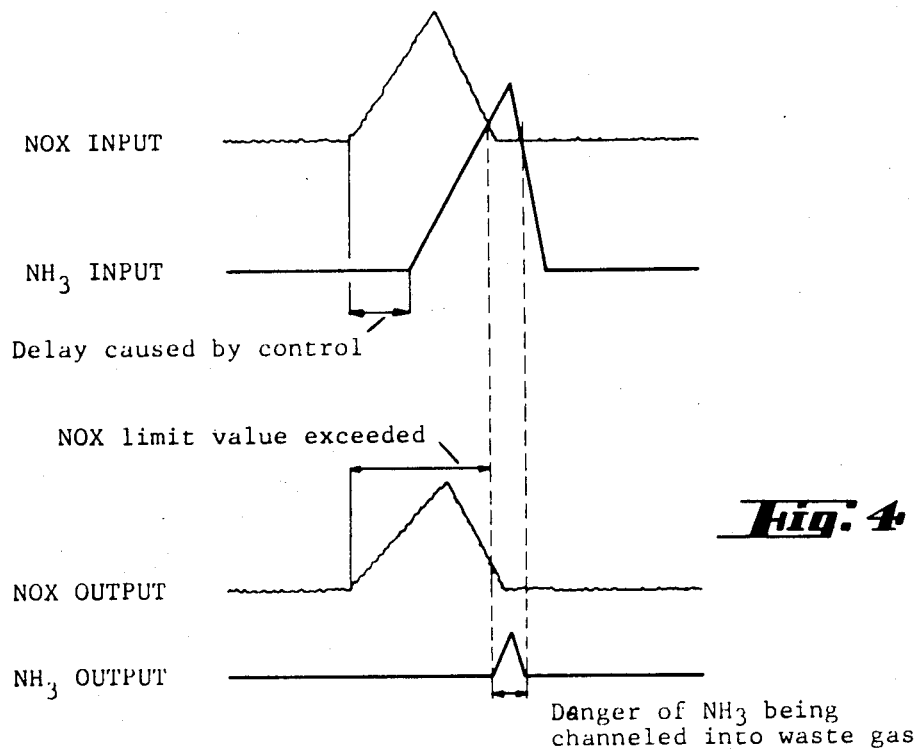
FIG. 4 shows how the channeling of ammonia into the waste gas can be prevented with the catalyst.
Figure 5:
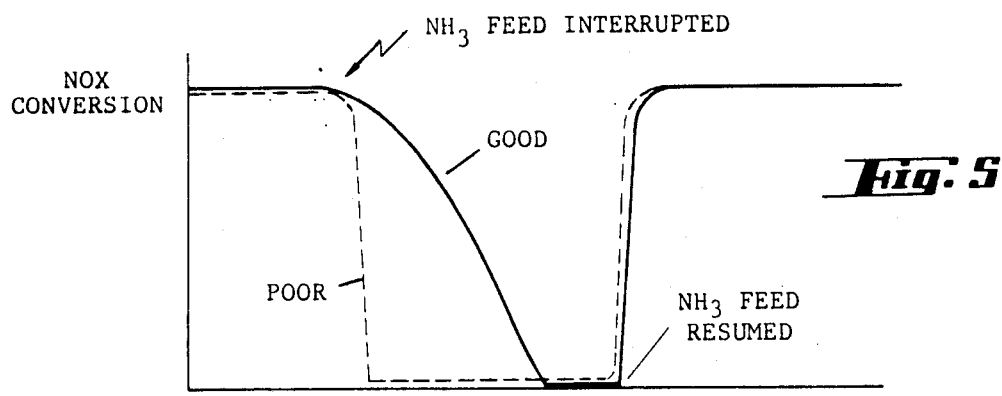
FIG. 5 shows the control action of a catalyst because of the high sorption capability for ammonia.

The catalyst as shown in FIGS. 3 through 5 retains an extraordinarily good control action, in addition to its known high activity and selectivity. Its possible applications, moreover, are very economical. The good control action is specifically determined by the relatively high sorption capability for ammonia, so that even with significant nitrogen oxide fluctuations in the waste gas to be purified, the danger of ammonia being channeled into the gas can be prevented, which would otherwise lead to problems in the downstream equipment. Because of the low oxidation capability of the catalyst described by the invention, there is no further oxidation of the sulfur dioxide, ammonia, or similar substances found in the gas to be purified. The sulfur trioxide, which occurs when sulfur dioxide is further oxidized, would otherwise be converted to sulfates with the ammonia in the waste gas stream. The oxidation of the ammonia added for the reduction to water and nitrogen, which does not take place because of the low oxidation capability of the catalyst, reduces the consumption of operating materials, so that a more economical operation of a purification process can be achieved.

For most applications of the catalyst, it is particularly advantageous if the sorption capability for ammonia is high enough so that in a temperature range of between approximately 280° C. and 450° C., and in spite of nitrogen oxide fluctuations of up to 200 milligrams per cubic meter and essentially constant ammonia feed, no ammonia is channeled into the waste gas.

In another configuration, it is advantageous if the activity and selectivity regarding the nitrogen oxide conversion are essentially constant in the temperature range between 280° C. and 450° C. and the oxidation capability is negligible.

According to another feature, the catalyst is characterized by macropores between approximately 0.5 and 50 microns.

The characteristics described above can be achieved, for example, by a mixture of substances, which exhibit the basic substances A and B, whereby the basic substance A comprises the following components:

89 to 92 percent by weight of $Fe_2O_3$;
3 to 4 percent by weight of $Fe_3O_4$;
4 to 5 percent by weight of $SiO_2$;
1 to 2 percent by weight of $Al_2O_3$;
0.01 to 0.2 percent by weight of MnO:
0.01 to 0.03 percent by weight of CaO;
0.01 to 0.02 percent by weight of MgO; and
0.7 to 0.001 percent by weight of $V_2O_5$,
and the basic substance B comprises the following components:
30 to 48 percent by weight of $Cr_2O_3$;
12 to 30 percent by weight of $Fe_2O_3$;
10 to 30 percent by weight of $Al_2O_3$;

10 to 25 percent by weight of MgO: and
1 to 5 percent by weight of $SiO_2$.

Surprisingly, such mixtures of substances have high activity and selectivity for nitrogen oxide conversion, high sorption capability for ammonia and low oxidation capacity for sulfur dioxide and ammonia, especially in the temperature range of between approximately 350° C. and 450° C. This is all the more surprising, since the known catalysts which contain $Fe_2O_3/Cr_2O_3$, of course, have relatively high activity and selectivity, as do combinations of $V_2O_5$ and $TiO_2$ in mixtures with $WO_3$. But there sorption capability with regard to ammonia is low, so that there is a poor control characteristic in the presence of severe and spontaneous nitrogen oxide fluctuations. The characteristics of the mixture of basic substances A and B are, therefore, surprising, because mixtures of $V_2O_5$ and $TiO_2$ already exhibit a significant oxidation-promotion effect in a temperature range from 350° C. to 450° C., which could only be limited by the addition of inhibitors, or else such a catalyst could not be used for gases containing sulfur. In the temperature range from 280° C. to 350° C., $V_2O_5/TiO_2$ catalysts exhibit relatively high activity and selectivity with regard to the nitrogen oxide conversion, as well as a low tendency to oxidation. They also exhibit a low sorption capability with regard to ammonia, so that their control characteristic is poor. $Fe_2O_3/Cr_2O_3$ mixtures exhibit a high sorption capability at temperatures from 280° C. to 350° C., which results in a good control behavior, but their activity is low.

Furthermore, it has been shown that, surprisingly, the activity of the mixture of substances can be significantly increased by sulfatization.

The same is true for a temperature range from 280° C. to 350° C., if the $V_2O_5$ is finely divided in the mixture.

According to one feature of the process, sufficient strength and water-resistance can be imparted to the dry mixture of substances of the catalyst if it is present in a grain size of less than 0.2 mm and bonded with a phosphate acid such as phosphoric acid.

The activation of the catalyst is carried out according to another characteristic feature, preferably by means of sulphuric acid or $VOSO_4$ by saturation.

A heat treatment, that is, calcination, of the mixture of substances is preferably done at 200° C. to 500° C., whereby temperature increase rates of preferably between about 500° C. per minute and about 1° C. per minute are used.

It is also proposed that fiber material of glass and/or ceramic and/or carbon and/or steel be added to the mixture of substances, which fiber material is used as a support structure during the molding of the mixture of substances into moldings.

The molding of the mixture of substances is preferably done isostatically into smooth or corrugated plates.

It has thereby been shown to be particularly advantageous if a molding pressure of between about 0.1 and about 100 metric tons per square centimeter.

The substances are molded, preferably into plates with a thickness of approximately 0.5 to 5 mm, and preferably approximately 1 to 3 mm.

According to another embodiment, the size of the plates is set during molding to between approximately 1 and 10,000 square centimeters.

An advantageous application of the catalyst comprises its use in the form of plates or corrugated plates at specified intervals in integrated units or cassettes, for the creation of a free-passage catalyst unit. The cassettes can exhibit corrugated spacer plates to separate the catalyst, present in the form of plates. This configuration results in infinitely long slits. The cassettes are appropriately combined to form complete reactors.

In the preparation of the catalyst using sulphuric acid as the bonding agent, the above-described process of FIGS. 3 to 5 may be used with the exception that sulphuric acid is used therein in place of the phosphoric acid or other phosphate acid.

The process of the production of catalysts is explained in greater detail hereinafter.

1. EXAMPLE FOR THE IMMERSION PROCESS

Manufacture of a slip

In 13 percent by weight water (in relation to the total amount), 65 percent by weight solid matter, for example, iron ore or chromium ore or a mixture of the two components, is dispersed by the addition of 0.2 - 1.0 percent by weight of an acid-stable liquefier, which can be a polyelectrolyte or a boundary layer active ester.

Then 22 percent by weight of 50% sulphuric acid, that is, at a concentration of 50%, is added.

Sample composition:
10–15 percent by weight water
0.2–1.0 percent by weight liquefier
65 percent by weight solid matter (iron ore/chromium ore)
20–25 percent by weight $H_2SO_4$ (50%)

The water can be replaced in stages by a lower-percentage concentration sulphuric acid.

Example of a complete replacement:
35 percent by weight $H_2SO_4$ having a concentration of 25%
0.2–1.0 percent by weight liquefier
65 percent by weight solid matter (iron ore/chromium ore)

The slip is placed in suitable immersion vessel, and the blank, for example, an endless or very long strip, is drawn through the immersion bath. To prevent air bubbles from being introduced into the immersion bath, the wire mesh to be coated should be introduced into the immersion bath at the most obtuse or oblique angle possible. The viscosity of the slip during the immersion process is between 50 cP (centipoise) and 300 cP, and preferably between 70 cP and 150 cP.

Figure 6:
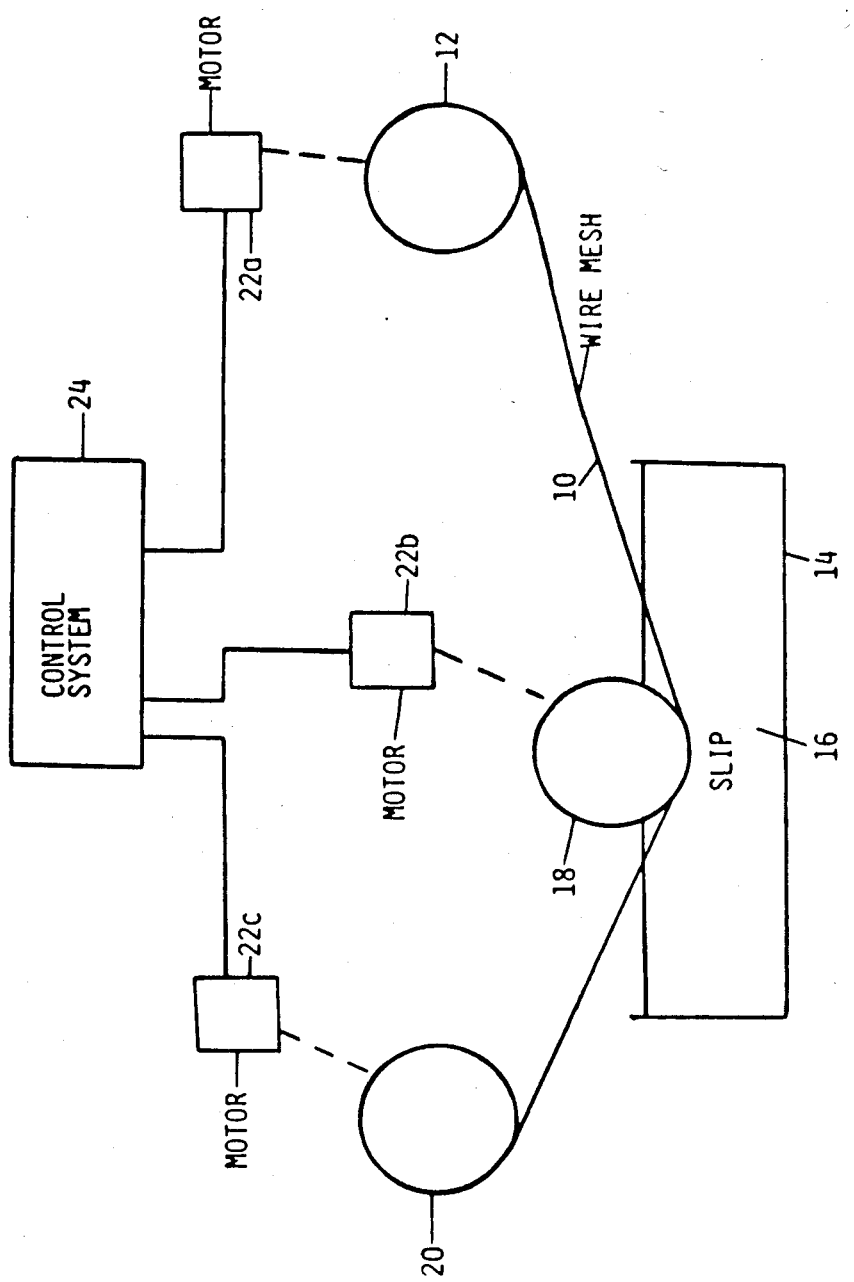
FIG. 6 shows a schematic representation of a coating process for coating a carrier.

FIG. 6 shows wire mesh 10 wound around a drum 12. The wire mesh 10 is fed through a vessel 14 filled with a slip 16 and is guided therethrough by another drum 18. The coated wire mesh 10 is preferably taken up on a third drum 20 or alternatively cut into lengths. Motors 22a, 22b and 22c power the drums 12, 18 and 20 respectively and are controlled by a control system 24, which keeps the wire mesh 10 substantially taut.

Immediately thereafter, the blank is continuously tempered, preferably up to 450° C., whereby a temperature increase of approximately 50° C. a minute is desired, with a hold time of five minutes or more at the final temperature.

If a continuous strip is used, the desired shapes are cut after tempering.

2. EXAMPLE OF THE SPRAY PROCESS

A slip is produced as described in Example 1.

With an arrangement of two spray nozzles, the slip is finely sprayed so that a solid wall of spray is achieved, through which the blanks or the continuous strips are continuously transported, resulting in that a bubble-free coating is deposited.

Then, analogous to Example 1, the blanks are tempered and, if endless strip is used, the desired shapes are cut after tempering.

To control the surface roughness and the porosity of the surface, during manufacture of the slip in Examples 1 and 2, approximately 0.5% to 2% of an acid-stable foaming agent is added to the water, preferably in the proportion of 1%, such as a polyvinyl alcohol.

3. EXAMPLE OF THE POWDERING OF AN ACID-WETTED WIRE FABRIC

The wetting of the wire fabric is preferably achieved by. immersing or spraying the blanks with 50% to 98% sulphuric acid.

Immediately thereafter, it is powdered with the appropriate solid material, for example, iron ore dust or chromium ore dust, with a fineness of less than 0.1 millimeters, and preferably 10–50 microns.

The powdering is done in batches in a fluidized bed, in which the blanks are exposed to a mixture of air and ore fines, whereby the dust adheres to the surfaces of the blank until the bonding strength of the acid is exhausted.

To support the deposition process, an electrical field can also be created in the fluidized bed, whereby the wire mesh blanks to be coated assume the role of the passive electrode.

An example of such coating is found in U.S. Pat. No. 4,517,219, entitled "Electrostatic Powder Coating Control Apparatus and Method" and is incorporated herein by reference as if the entire contents thereof were fully set forth herein.

Analogous to Example 1, a tempering is then conducted up to 450° C.

In order to achieve the configuration of FIG. 1, the catalytic materials with their different binders can be mixed and then pressed or otherwise formed into a catalyst plate. In the configuration of FIG. 2, separate parts can be made, each from the catalyst with different binders, and then these parts can be joined together by, for example, pressing or otherwise, to form the catalytic plate therein.

Methods of forming the plates of the present invention are well known in the prior art. Some recently published examples are found in U.S. Pat. No. 4,495,118, entitled "Ceramic Plates and Method For The Production Thereof": U.S. Pat. No. 4,183,885, entitled "Quick Baking Process for Ceramic Products": U.S. Pat. No. 4,092,092, entitled "Apparatus for Making Ceramic Articles"; U.S. Pat. No. 3,965,246, entitled "Process for the Production of Ammonia Using Aligned Catalyst Particles": and U.S. Pat. No. 3,881,696, entitled "Catalyst for Cleaning Engine Exhaust Gases". All of the above-cited patents are incorporated by reference as if the entire contents thereof were fully set forth herein.

The plates may be made from natural raw material (such as ore without preliminary grinding) containing $Fe_2O_3$, $Cr_2O_3$, or another such catalyst component such as $TiO_2$ $NbO_2$, $WO_3$, $V_2$, or $MoO_3$, which material is screened to a grain size below approximately 0.25 mm. The screened basic mixture is thoroughly blended, and then preferably a concentrated sulphuric acid is added. This material mixture is then pressed into a molding in a hydraulic press with a pressure of approximately 500 bar. It has been shown that, as a result of the addition of the concentrated sulphuric acid, the materials $Al_2O_3$, MgO, CaO and other similar materials which occur in the natural ore rapidly set and form a sulfated support element for the molding, which thereby receives sufficient stability for handling, even if the molding comprises relatively complicated and thin structures. The above-mentioned formation of $MgSO_4$, $CaSO_4$, etc., also prevents a reduction in the size of the micropores formed during manufacturing when the catalyst is exposed to exhaust gases containing sulphur trioxide. Unsuccessful attempts have been made in the past to control the size of these micropores, using $Fe_2O_3$ on aluminum oxide carriers.

It has been shown that approximately 20 to 60 ml, preferably 40 ml, of sulphuric acid can advantageously be added to 100 g of screened basic mixture. This relatively small quantity of concentrated sulphuric acid can be used to make certain that the hygroscopic properties of the catalyst molding produced remain within acceptable limits.

In the process, additional strength can also be achieved through the use of phosphate binder by using a concentrated sulphuric acid which contains up to 10%, that is, only a relatively small proportion, of phosphoric acid. Such a measure is taken, however, at the expense of a certain deactivation of the catalyst components by blocking the voids, for example, in $Fe_2O_3$/$Fe_3O_4$ mixtures.

The manufacturing process is preferably executed so that the basic mixture is applied to a plate-shaped support body, an external mold is placed on top of it and filled with basic material which is slightly compressed and scraped, another plate-shaped cover is placed on the mold, and this unit is subjected to the mold pressure. The mold can also exhibit spacers.

The support body and the cover are advantageously sprayed, before the basic material is placed inside, with a molding parting compound, preferably a material containing silicon.

The entire unit comprising the support body, the external mold and the cover can therefore be removed all at once from the press, and subjected as a unit to the drying and calcining process. The catalyst molding is thus not exposed to any stresses, as was the case with manufacturing processes of the prior art.

The drying is preferably done at approximately 150° C. for a period of 5 to 500 minutes, and calcining is done at approximately 450° C., also for a period of approximately 5 to 500 minutes.

It also turns out to be particularly advantageous to leave the molding in the calcining furnace for approximately 1 to 24 hours after the calcining process, and removing it from the calcining furnace only after it has cooled to a temperature of between approximately 200° to 200° C. Then the finished, for example, plate-shaped, catalyst molding can be inserted into cartridges, and used in an electric power generation plant.

The catalyst moldings manufactured exhibit good control characteristics, high yields and a wide temperature range with high activity.

An example of the polyelectrolyte found on page 9, line 7, is DOLAPIX, manufactured by Zschimmer & Schwarz Chemische Fabriken GmbH & Co, D-5420 Lahnstein/Rhein, Federal Republic of Germany. Different forms of DOLAPIX, such as, DOLAPIX PCN, DOLAPIX PC 67, DOLAPIX CA and DOLAPIX CE 64, may be used.

An example of the boundary layer active ester found on page 9, lines 7-8, is DOLAPIX ET 85, also manufactured by Zschimmer & Schwarz Chemische Fabriken GmbH & Co.

Another example of an electrolyte usable in the practice of this invention is DOLAFLUX E 18, manufactured by the same manufacturer as above.

Further examples of polyelectrolytes are DOLAPIX PC 25 and DOLAPIX PC 33, manufactured by the same manufacturer as above.

The invention as described hereinabove in the context of the preferred embodiments is not to be taken as limited to all of the provided details thereof, since modifications and variations thereof may be made without departing from the spirit and scope of the invention.

What is claimed is:

1. A catalytic plate structure for reducing at least one oxide of nitrogen, said catalytic structure comprising:
   a first catalytic material comprising an $Fe_2O_3$ catalyst substance with sulphuric acid as a binder and having a first catalytic activity with respect to said at least one oxide of nitrogen and also having a first sensitivity to water which physically degenerates said first catalytic material at a first rate;
   a second catalytic material comprising $Fe_2O_3$ catalyst substance with phosphoric acid as a binder and having a second catalytic activity with respect to said at least one oxide of nitrogen and also having a second sensitivity to water which physically degenerates said second catalytic material at a second rate;
   said first catalytic material being disposed in at least one first region in said structure;
   said second catalytic material being disposed in at least one second region in said structure;
   said at least one first region and said at least one second region being substantially distinct one from the other;
   said first catalytic activity of said first catalytic material being substantially distinct one from the other;
   said first catalytic activity of said first catalytic material being substantially greater than said second catalytic activity of said second catalytic material;
   said first rate of physical degeneration of said first catalytic material by water being substantially greater than said second raate of physical degeneration of said second catalytic material by water, whereby said first catalytic material does dengenerate physically when acted upon by water, in use;
   said second catalytic material further being substantially insensitive to degeneration by water, whereby said second catalytic material does not substantially degenerate when acted upon by water, in use; and
   said second catalytic material being disposed in said structure to physically reinforce said first catalytic material in said structure, whereby said structure is also reinforced by said second catalytic material, even when said first catalytic material is substantiaally physically degenerated by water, whereby said catalytic structure has a catalytic activity which is substantially greater than said catalytic activity of said second catalytic material alone.

2. The catalytic plate structure according to claim 1, wherein said first catalytic material is granular.

3. The catalytic plate structure according to claim 1, wherein said second catalytic plate material is granular.

4. The catalytic plate structure according to claim 2, wherein said second catalytic material is granular.

5. The catalytic plate structure according to claim 1, wherein said at least one region of said first catalytic material and said at least one region of said second catalytic material are disposed in layers abutting one another in said structure.

6. The catalytic plate structure according to claim 4, wherein said at least one region of said first catalytic material and said at least one region of said second catalytic material are disposed in layers abutting one another in said structure.

7. The catalytic plate structure according to claim 5, wherein there are a plurality of layers in said structure of said second catalytic material having sulphuric acid as a binder.

8. The catalytic plate structure according to claim 7, wherein said second catalytic mateiral, having said sulphuric acid as a binder, comprises outside layers of said structure.

9. The catalytic plate structure according to claim 1, wherein said at least one region of said first catalytic material comprises a pluraltiy of regions and wherein said at least one region of said second catalytic material comprises a plurality of regions;
   said first and said second plurality of regions being dispersed throughout a substantial portion of said catalytic body.

10. A catalytic plate for reducing at least one oxide of nitrogen, said catalytic structure comprising:
    a first catalytic substance, said first catalytic substance comprising $Fe_2O_3$ and a sulphuric acid binder;
    said first catalytic substance having a first catalytic activity with respect to said at least one oxide of nitrogen and having a first resistance to degeneration by water; and
    a second catalytic substance, said second catalytic substance comprising $Fe_2O_3$ and a phosphoric acid binder;
    said first catalytic substance having a first catalytic activity substantially greater than said second catalytic activity of said second catalytic substance, and said second substance having a second resistance to degeneration by water substantially higher than said first resistance of said first substance to degeneration by water;
    said first catalytic substance being disposed in at least one region of said plate;
    said second catalytic substance being disposed in at least one second region of said plate;
    said at least one first region and said least one second region being substantially distinct from one another, whereby said first catalytic substance and said second catalytic substance are not substantially mixed within said plate;
    and whereby said catalytic structue has a substantially higher catalytic activity than second catalytic substance alone and has a substantially higher resistance to degeneration by water than said first catalytic substance alone.

11. The catalytic plate according to claim 10, wherein said first and second catalytic substances are distributed substantially throughout substantially all regions of said catalytic structure.

12. the catalytic plate according to claim 10, wherein said catalytic structure comprises at least a first subregion consisting essentially of said first catalytic substance and a second subregion consisting essentially of said second catalytic substance.

13. The catalytic plate according to claim 10, wherein at least one of said first and second catalytic substances is granular.

14. The catalytic plate according to claim 12, wherein said first subregion of said first catalytic substance and said second subregion of said second catalytic substance are disposed in layers abutting one another in said structure.

15. The catalytic plate according to claim 14, wherein in there are a plurality of layers in said structure of said first catalytic substance having sulphuric acid as a binder.

16. The catalytic plate according to claim 15, wherein said first catalytic substance, having said sulphuric acid as a binder, comprises outside layers of said structure.

17. The catalytic plate according to claim 10, wherein said catalytic structure comprises a plate of catalytic materials.

18. The catalytic plate according to claim 17, wherein said structure is molded.

* * * * *

UNITED STATES PATENT AND TRADEMARK OFFICE
CERTIFICATE OF CORRECTION

PATENT NO. : 4,742,036

DATED : May 3, 1988

INVENTOR(S) : Flockenhaus et al

It is certified that error appears in the above-identified patent and that said Letters Patent is hereby corrected as shown below:

On the title page item [73] should read as follows:

--Didier-Werke AG, Wiesbaden, Didier Engineering GmbH, Essen, Fed. Rep. of Germany--.

Signed and Sealed this

First Day of November, 1988

Attest:

DONALD J. QUIGG

Attesting Officer

Commissioner of Patents and Trademarks